Dec. 21, 1943.  S. C. WATSON  2,337,075
SHAFT COUPLING
Filed Jan. 26, 1942  3 Sheets-Sheet 1

Inventor
Sydney C. Watson
by Parker & Carter,
Attorneys

Dec. 21, 1943.   S. C. WATSON   2,337,075
SHAFT COUPLING
Filed Jan. 26, 1942   3 Sheets-Sheet 2

Inventor
Sydney C. Watson
by Parker & Carter
Attorneys

Dec. 21, 1943.                S. C. WATSON                2,337,075
                              SHAFT COUPLING
                          Filed Jan. 26, 1942              3 Sheets-Sheet 3

Inventor
Sydney C. Watson
by Parker & Carter
Attorneys.

Patented Dec. 21, 1943

2,337,075

UNITED STATES PATENT OFFICE 2,337,075

SHAFT COUPLING

Sydney C. Watson, Chicago, Ill., assignor to Tor-Vel Associates, having as trustees, Sydney C. Watson and Alvin J. Parcelle Application January 26, 1942, Serial No. 428,261

13 Claims. (Cl. 74—89.5)

This invention relates to a shaft coupling and to a system of power transmission. The mechanism and system of this invention may be used as a connection between a prime mover and almost anything it is desired to move. It may be used to drive a machine, a vehicle or any other device or load.

An object of the invention is, therefore, to provide a transmission system through which power may be transmitted from a source of power to some point, device or apparatus upon which it is desired to make the power effective. It is particularly adapted to conditions where a varying torque is required, that is, to a torque which may at times be higher than that available directly from the prime mover. An illustration of such a condition is that of the high starting torque required by motor vehicles or required by such vehicles driving and operating in hilly or mountainous country, particularly with heavy loads where the torque requirements may vary widely.

Another object of the invention is to provide a coupling means for a driving system which would automatically vary the torque delivered in response to variation in load or in the torque demand. The particular form of the device illustrated is adapted for a vehicle transmission but might be used for other work.

A further important object of the device is the provision in a transmission or drive of the type indicated above of means within the transmission adapted to produce a high degree of reduction. The device may be used with a clutch such as a friction clutch and a reverse gear assembly. These parts, however, form no essential part of the invention, which may be used without either of them or with one and without the other. The presence or absence of the clutch is determined largely by the nature of the prime mover or other means which drives the transmission.

Another object of the invention is to provide a device of the type indicated which under certain conditions the mechanism operates to provide a varying torque in response to variations in the torque demand or the load and which, in addition, provides a positive geared reduction mechanism drive under certain conditions and in which a high degree of reduction is or may be accomplished.

Other objects will appear from time to time in the specification and claims.

This invention is illustrated more or less diagrammatically in the accompanying drawings, wherein.

Like parts are designated by like characters throughout the specification and drawings.

Figure 1:
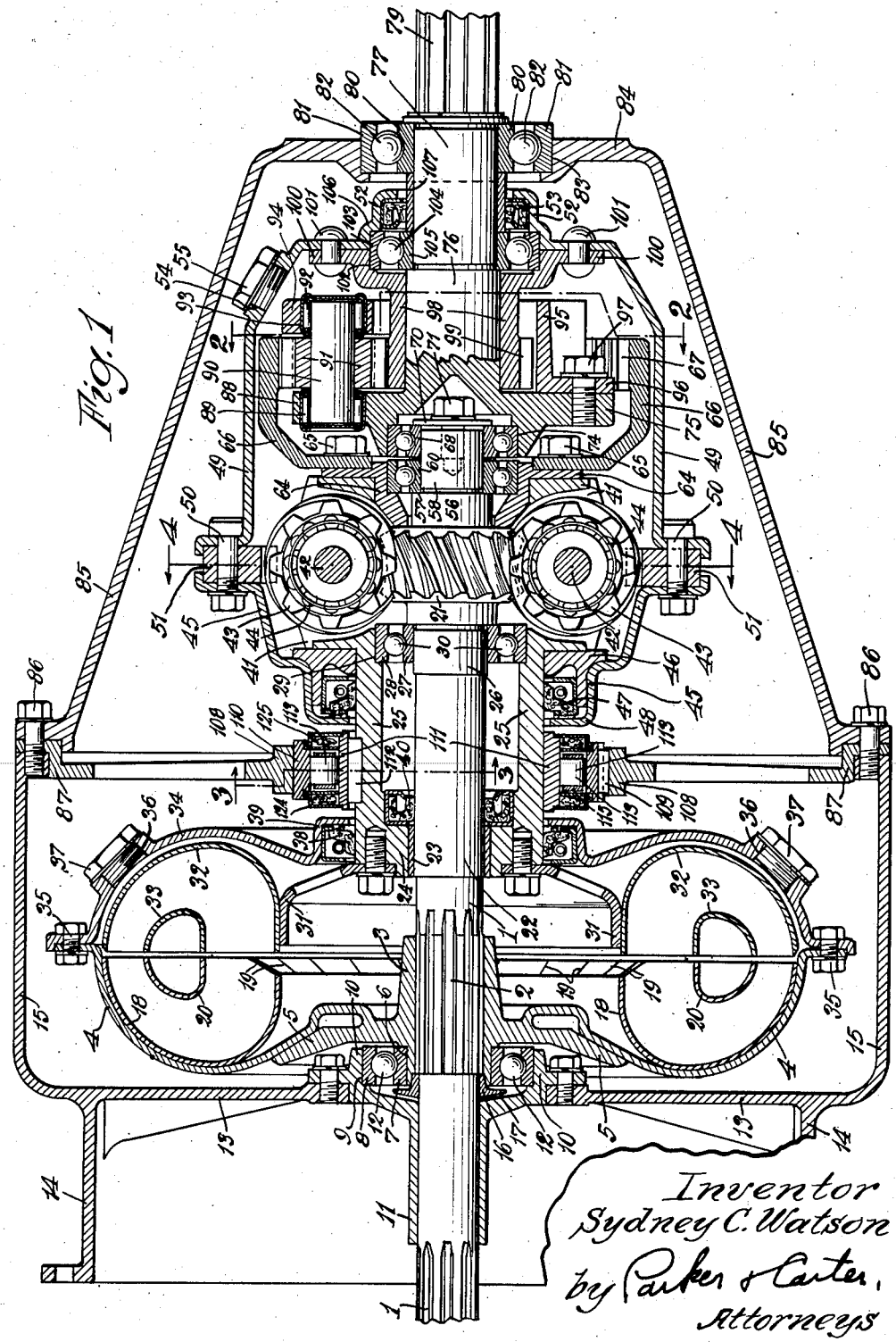
Fig. 1 is a longitudinal section through one form of the device from which the clutch and gear shift are omitted.
Figures 2, 3:
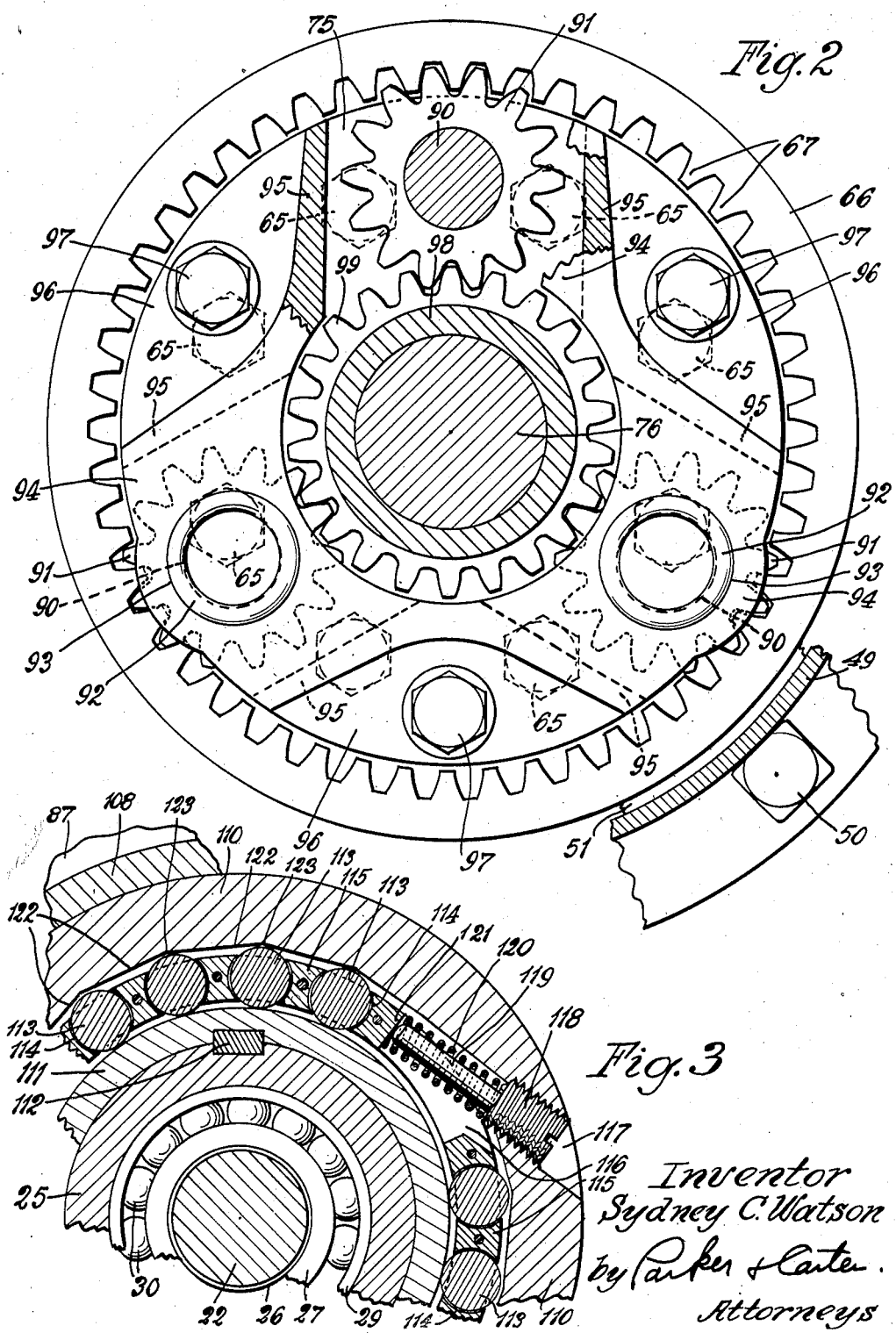
Fig. 2 is a transverse section taken at line 2—2 of Fig. 1.
Fig. 3 is a transverse section taken at line 3—3 of Fig. 1.
Figure 4:
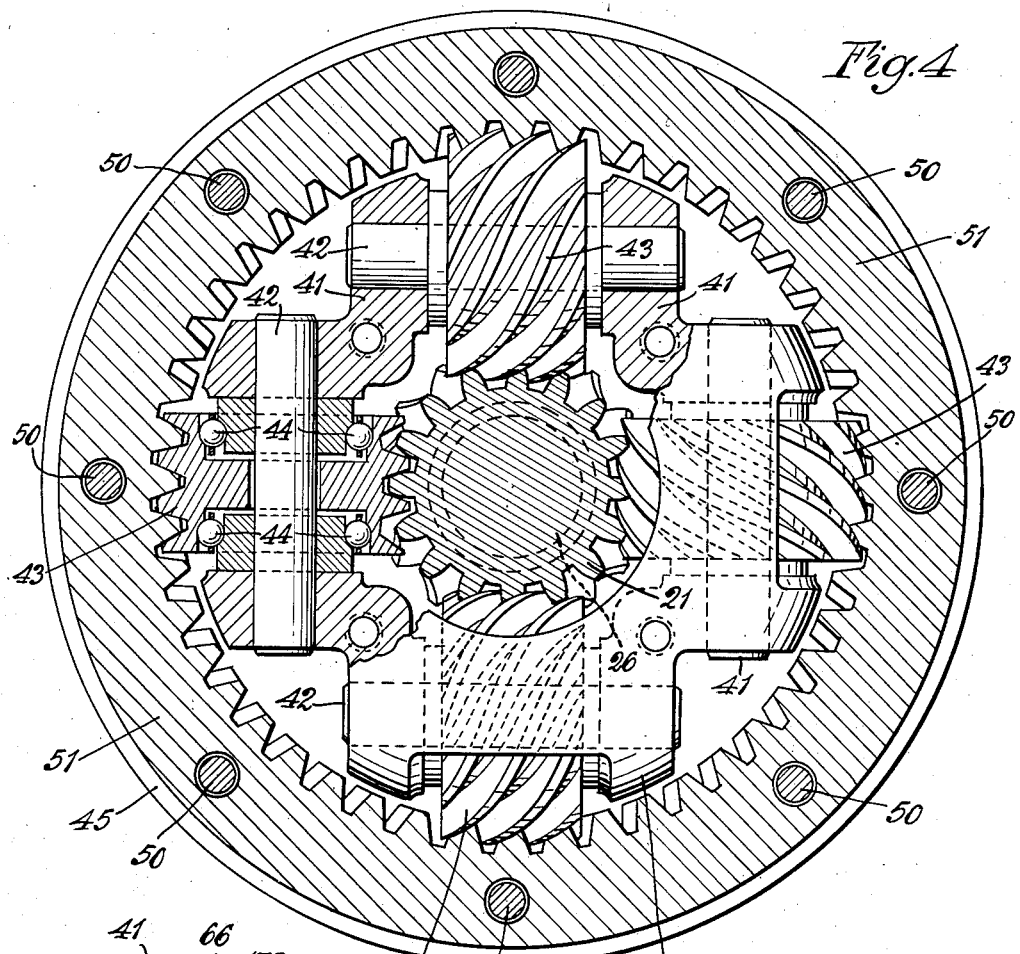
Fig. 4 is a transverse section taken at line 4—4 of Figure 1.
Figure 5:
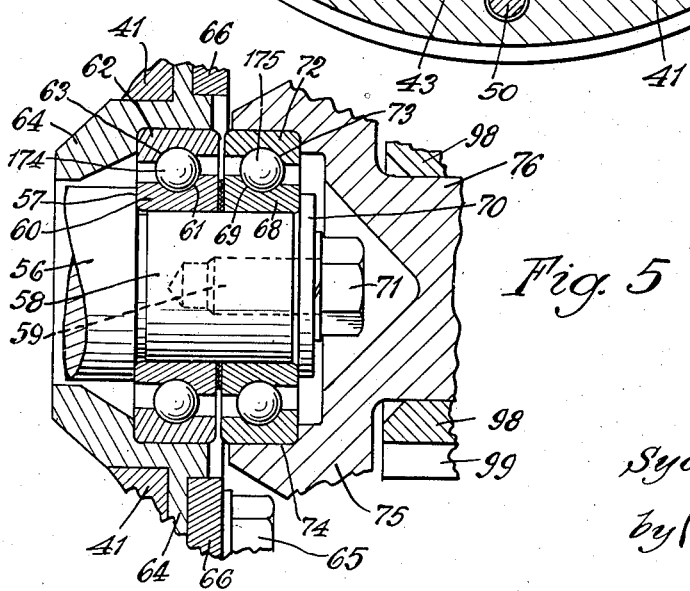
Fig. 5 is an enlarged detail section of a portion illustrated in Figure 1.

1 is a driving shaft to which power is applied from any desired source. It may conveniently be an internal combustion engine but the invention is in no sense limited to the use with such an engine. The shaft is preferably splined as at 2 to receive a hub 3 from which a housing 4 extends. The housing may be made integrally with the hub and it may be made separate and attached thereto. An additional member 5 may be formed as a part of the hub or secured thereto. The hub is shaped to provide a seat 6 upon which the inner member 7 of an anti-friction bearing is positioned. The outer race 8 of the bearing is positioned in a shoulder 9 which is conveniently formed in a housing member 10 from which a cylindrical extension 11 may extend about a portion of the shaft 1. Balls or other anti-friction members 12 are positioned between the races 7 and 8. A housing member 13 may be secured to the portion 10 and may comprise at one side a generally cylindrical member 14 and at the opposite side a generally cylindrical member 15 which, in the particular form here shown, is of larger diameter than the member 14 although the respective dimensions are not an essential part of the invention and might be varied. A member 16 may be positioned about the shaft 1 adjacent the splined portion 2 and, as shown, extends partly under the hub 3. It may also be provided with a laterally extending tapered flange 17.

Secured to the housing member 4 is an impeller portion 18 of a liquid coupling. Vanes 19, 19 form a part of the coupling and are secured at their outer edges to the portion 18. They may at their inner edges be secured to a portion 20.

The shaft 1 is provided with an external worm gear 21. Between the splined portion 2 and the worm gear it is provided with a bearing portion 22 which is in contact with a bushing 23. This bushing is positioned upon a suitable seat portion 24 formed as a part of a generally tubular member 25. The shaft 1 is provided with a second bearing portion 26 upon which the inner race 27 of an anti-friction bearing is positioned. The outer race 28 of this bearing is received in a seat 29 formed in the member 25 and balls or other anti-friction members 30 are positioned between the seats 27 and 28. The member 25 has secured to it a runner carrier member 31 to which a runner 32 is secured. A core member 33 may be provided, if desired. A housing member 34 is secured by the bolts 35 or otherwise at its outer edge to the corresponding edge of the housing member 4.

One or more opening 36 may be provided to the cavity which is enclosed within the runner and impeller housing and these openings may be closed by removable plugs 37. The openings serve for filling or draining the fluid coupling. A packing assembly 38 is positioned within a shoulder 39 formed in or adjacent the inner edge of the housing 34. This packing seals the space between the housing 34 and the member 25. A packing 40 is positioned within the member 25 and adjacent the bushing 23 and in contact with the bearing portion 22 of the shaft 1. This prevents the escape of fluid from one unit to the other within the coupling.

Secured to or forming a part of the generally tubular member 25 is a gear carrier 41. Positioned within this carrier is a plurality of shafts 42 and upon each of these shafts is mounted an idler worm gear 43. As shown, these worm gears are generally "barrel-shaped" and are in mesh with the external worm gear 21. Anti-friction bearings 44 may be provided for the worm gears. A housing member 45 is in part supported on a race-like member 46 which is in contact with an outer portion of the member 25 and a sealing assembly 47 is positioned within a shoulder 48 of the member 45 and prevents escape of lubricant from the space within the housing member 45. An additional housing member 49 is secured at its outer edge to the outer edge of the housing 45 by means of bolts 50 or otherwise, and between the two housing members 45 and 49 there is secured an internal worm gear 51 which meshes with the idler worm gears 43.

The housing member 49 at its right-hand end, as shown in Fig. 1, is provided with a shoulder portion 52 within which is positioned a sealing assembly 53. Openings 54 may be provided in the housing 49 and these are closed by removable plugs 55.

To the right of the worm gear 21, in Fig. 1, the shaft 1 is provided with an enlarged portion 56 which forms a shoulder 57 between it and a reduced portion 58. This latter is provided at its outer end or on its outer surface with a threaded perforation 59. Positioned upon the reduced portion 58 is the internal race 60 of an anti-friction member. It will be noticed that this inner race 60 is provided on one side with a shoulder 61 which is higher than the corresponding shoulder. The outer race 62 is provided with a raised shoulder 63 which is higher than the opposite shoulder and thus the shoulders 61 and 63 of the inner and outer races respectively are positioned opposite to each other, one being to the right and one being to the left, as shown in Fig. 1. The outer race 62 is received in a member 64 which is secured to the carrier 41 by one or more screws 65. These screws also fasten to the carrier 41. 66 is an additional gear carrier, which has secured to or formed on its inner face an internal gear 67.

Positioned also on the reduced portion 58 of the shaft 1 and adjacent to the anti-friction bearing which includes the races 60 and 62 is a second and oppositely placed anti-friction bearing assembly comprising an inner race 68 having a raised shoulder 69. The races 60 and 68 are held in place by a washer 70 which is itself secured removably in place by a screw 71 seated in the perforation or cavity 59. The outer race 72 of the bearing, which includes the inner race 68, is provided with a raised shoulder 73 and this shoulder 73 is placed opposite to the shoulder 69 of the race 68, that is the shoulder 69 is to the left in Fig. 1 and the shoulder 73 is to the right. Balls or other rolling members 174 and 175 are placed respectively between the races 68 and 62 and the races 68 and 72.

The outer race 72 is secured in a shoulder portion 74 formed in an extension 75 of the driven shaft 76. This shaft is reduced as at 77. It may be splined as at 79. The portion 77 is supported in an anti-friction bearing which includes an inner race 80, an outer race 81 and balls or other rotary members 82. The outer race 81 is received in a shoulder 83 formed in a portion 84 of a housing member 85 which housing member is secured to the housing portion 15 by screws 86 or otherwise. A portion 87 of a one-way clutch or brake assembly, which will be described below, may be conveniently secured between the members 15 and 85.

The extension 75 of the shaft 76 is provided with a plurality of perforations 88 within which is secured an anti-friction bearing assembly 89 which supports one end of a shaft 90. Upon this shaft is mounted a spur gear 91 which meshes with the gear portion 67 of the member 66. The opposite end of each of the shafts 90 is mounted in an anti-friction bearing assembly 92 which is itself positioned in a perforation 93 in a support 94. This support includes portions 95 and other portions 96 which are in contact with the extension 75 of the shaft 76 and are secured removably in place by screws 97 or otherwise.

Positioned about the shaft 76 is a hub-like member 98 which is provided with a gear portion 99 which meshes with the spur gears 91. The portion 98 is provided with a lateral extension or enlargement 100 which is secured by rivets 101 or otherwise to the housing portion 49. This member 100 is provided with a shoulder 102 against which is set the outer race 103 of an anti-friction radial thrust bearing which includes also balls or other rollers 104 and an inner race 105 which is itself seated against the shoulder formed by the shaft portions 76 and 77. The outer race 103 is also seated within a shoulder 106 formed in the housing member 49. A spacing member 107 is positioned about the shaft portion 77 and at one end abuts against one face of the inner race 105 and at its opposite end abuts against the opposite face of the inner race 80.

Means are provided for preventing reverse turning movement of the member 25 and the carrier 41 which is attached to it. This of course also resists reverse rotation of the member 66, which is secured to the carrier by the bolts 65. The means for preventing this reverse rotation comprise a one-way roller clutch or brake which is in effect a "no-back" device. Many forms of such one-way clutches or brakes are well-known and almost any form may be used in this device. The particular form shown herewith is merely one such roller brake or clutch, and its details form no part of the present invention. Almost any means for preventing reverse rotation may be used.

The particular form of no-back device herewith illustrated includes a hub-like member 108 secured to or formed as a part of the fixed member 87. A key 109 secures a sleeve 110 in position and prevents rotation. This sleeve as shown forms an outer bearing and clutch or brake member. 111 is an inner sleeve which is also a bearing and clutch or brake member, and it is keyed by the key 112 to the tubular member 25. A plurality of rollers 113 is positioned between the members 110 and 111. As shown these are straight-sided rollers, but many other types of rotary members might be substituted for them. They are mounted within seats 114 formed in a cage or retainer 115. As shown, the member 115 is continuous and is in effect a ring which extends about the member 111. It may have one or more cut-away spaces or openings 116. The member 110 is provided with a bore 117 for each of the cut-away spaces 116, whether there be one or more of these spaces, and a screw 118 is adjustably positioned in threads formed in the bore 117. The screw has attached to it or formed as a part of it an inwardly extending pin 119 about which is positioned a coiled spring 120. The spring bears at one end upon the end of the threaded portion 118 of the screw, and at its other end it bears against a seat 121 formed within the space 116. A surface of the inner face of the outer member 110 is formed of a plurality of flat portions 122, which meet at 123 to form slightly raised spaces.

Packing means are preferably provided about the one way roller clutch or brake, and as shown they comprise packing assemblies 124 and 125 positioned respectively on each side of the one way roller clutch or brake assembly.

It will be realized that whereas I have described and shown a practical and operative embodiment of my invention and the method for carrying it out, nevertheless many changes may be made in the size, shape, number and disposition of parts and in the details and steps of such method without departing from the spirit of my invention. I therefore wish my description and drawings to be taken as in a broad sense illustrative or diagrammatic, rather than as limiting me to my precise showing.

In particular, the bearing, packing, and other structural details may be widely varied without departing from the spirit of the invention. As shown, except in the one-way roller clutch or brake, ball bearings are shown wherever anti-friction bearings are desired. Other forms of anti-friction bearings may be used or for some purposes and with some materials anti-friction bearings could be omitted. The invention is not limited to any particular type of fluid coupling. The one shown is a well-known one in the prior art, and the invention is not limited to its details. The housing details as shown are worked out for ready manufacture, ready assembly, and ready demounting, for purposes of repair. Other elements, however, might be embodied without departing from the spirit of the invention. The reduction gear, which includes—among other features—the elternal gear 99, the internal gear 67, and the meshing pinions 91, might be varied. Other forms of gears might be substituted and a different number of idler gears might be used. The bearing construction of these members can be widely varied, and the support which carries the idlers can also be widely varied. Whatever the particular structural details chosen for a given design, the present invention includes a driving shaft, an external worm fixed on it, an idler carrier including idlers meshing with said external gear, a fluid coupling inserted between the driving shaft and the idler carrier, a driven shaft, an external gear mounted for movement with respect to it, an internal gear carrier fixed to the idler carrier, and a plurality of idler reduction gears positioned between the two last mentioned gears.

The use and operation of the invention are as follows:

The device of this invention is intended to be associated with a source of power with or without a clutch. For some purposes and depending upon the source of power, no clutch between the driving shaft and the source of power is needed. Under other conditions a clutch will be used. For many purposes a reverse gear assembly is desirable, but none is shown as the invention is not limited to use in connection with a reverse gear.

Assuming the device as shown to be connected to a source of power, and assuming the driven shaft to be connected to something which is to be driven, if the source of power is now actuated, the driving shaft will rotate, and under all conditions in which rotation is possible, the gear 21 will rotate with it, and the impeller of the fluid coupling will rotate with it. If the torque requirements on the driven shaft 79 are extreme, the force effective to move the runner may not be sufficient to do so, and when that is the case, the member 25 cannot be driven, and because of the one way roller clutch or brake it cannot move in reverse direction. Hence it remains stationary, and the carrier which is secured to it also remains stationary. However, since the gear 21 rotates, the idlers 43 rotate on their separate axes, and since they engage the internal gear 51, it is rotated. In turn, it rotates the member 98 to which the external gear 99 is secured, and this causes rotation of the pinions 91 which mesh with it. The internal gear carrier 66, being secured to the idler worm carrier 41, cannot move, and the pinions 91 are thus moved not only upon their individual axes but they move about the internal gear 67, and thereby they rotate the shaft 76 upon which the pinions 91 are mounted, and in this manner an additional reduced ratio is effective. When the torque requirements are as indicated, there is reduction in the worm drive assembly, and an additional or secondary reduction in the spur gear assembly. The amount of these individual reductions and of the total reduction depends upon the design of the gears. However, there can be a very considerable reduction.

If the torque requirements are relatively slight, sufficient driving effect is available to drive the runner of the fluid coupling, and when that occurs the member 25 is driven and the carrier which carries the idler worms is driven, and with them the internal worm gear 51 is driven. Torque requirements may be such that the entire worm gear assembly rotates as a unit. The idler gears in that condition do not rotate on their axes but are carried about by the external worm gear 21 and merely serve to transmit directly the power from that gear to the gear 51. When that occurs no reduction is accomplished by the gear 21 and the gear 51. Under the conditions just described the spur gear carrier 66 moves with the idler worm carrier 41, and thus the internal spur gear 67 is rotated, and its speed of rotation may be the same as the speed of rotation of the member 95 in which the idler pinions 91 are mounted.

When that occurs these pinions do not rotate about their individual axes but are carried about their orbit without individual rotation, and thus the driven shaft 76 is rotated at the same speed as the driving shaft 1.

The two extreme conditions possible with this drive have been pointed out above. There is a very wide variety of intermediate conditions which may occur, depending upon the torque requirements to which the device is submitted. Under some conditions the carrier 41 will be rotated, but it will be rotated slower than the driving shaft 1, and hence the carrier 41 moves about the driving shaft. When this occurs, there is relative movement between the gear 21 and the gear 51. In this condition the idler worms 43 have orbital movement about the axis of the shaft 1, and have additional individual rotation on their individual axes, and thus some reduction occurs, but it is less than the maximum reduction which occurs when the carrier 41 is stationary. When there is this relative movement between the carrier 41 and therefore relative movement between the gear 51 and the gear 21, a similar movement occurs between the carrier 87 and the member 95, so that a further reduction occurs in the spur gear assembly. The degree of reduction which occurs under the conditions just mentioned in the worm gear assembly and in the spur gear assembly depends upon the torque requirements, and the degree of reduction accomplished in these two gear assemblies varies automatically as the torque requirements vary from the maximum reduction to a point of no reduction.

I claim:

1. In combination in a drive, a driving shaft, a fluid coupling associated therewith, including an impeller fixed in relation to said shaft, a carrier rotatable about said shaft, a fluid coupling runner fixed in relation to said carrier, an external worm gear positioned on said driving shaft, a plurality of idler worm gears mounted for rotation in said carrier and meshing with said external worm gear, an internal worm gear positioned about said idlers and meshing therewith, a driven shaft, an external gear positioned about said driven shaft for motion with respect thereto, said external gear being joined to said internal worm gear and held against rotation with respect thereto, a second internal gear fixed in relation to said carrier, and a member secured to said driven shaft, a plurality of idler gears mounted for rotation in said member and meshing with said last-mentioned external and internal gears.

2. In combination in a drive, a driving shaft, a fluid coupling associated therewith, including an impeller fixed in relation to said shaft, a carrier rotatable about said shaft, a fluid coupling runner fixed in relation to said carrier, an external worm gear positioned on said driving shaft, a plurality of barrel-shaped idler worm gears mounted for rotation in said carrier and meshing with said external worm gear, an internal worm gear positioned about said idlers and meshing therewith, a driven shaft, an external gear positioned about said driven shaft for motion with respect thereto, said external gear being joined to said internal worm gear and held against rotation with respect thereto, a second internal gear fixed in relation to said carrier, and a member secured to said driven shaft, a plurality of idler gears mounted for rotation in said member and meshing with said last-mentioned external and internal gears.

3. In combination in a drive, a driving shaft, a fluid coupling associated therewith, including an impeller fixed in relation to said shaft, a carrier rotatable about said shaft, a fluid coupling runner fixed in relation to said carrier, an external worm gear positioned on said driving shaft, a plurality of idler worm gears mounted for rotation in said carrier and meshing with said external worm gear, an internal worm gear positioned about said idlers and meshing therewith, a driven shaft, an external gear positioned about said driven shaft for motion with respect thereto, said external gear being joined to said internal worm gear and held against rotation with respect thereto, a second internal gear fixed in relation to said carrier, and a member secured to said driven shaft, a plurality of idler gears mounted for rotation in said member and meshing with said last-mentioned external and internal gears, and means for preventing reverse rotation of said first-mentioned carrier.

4. In combination in a drive, a driving shaft, a fluid coupling associated therewith, including an impeller fixed in relation to said shaft, a carrier rotatable about said shaft, a fluid coupling runner fixed in relation to said carrier, an external worm gear positioned on said driving shaft, a plurality of barrel-shaped idler worm gears mounted for rotation in said carrier and meshing with said external worm gear, an internal worm gear positioned about said idlers and meshing therewith, a driven shaft, an external gear positioned about said driven shaft for motion with respect thereto, said external gear being joined to said internal worm gear and held against rotation with respect thereto, a second internal gear fixed in relation to said carrier, and a member secured to said driven shaft, a plurality of idler gears mounted for rotation in said member and meshing with said last-mentioned external and internal gears, and means for preventing reverse rotation of said first-mentioned carrier.

5. In a drive, a driving shaft, a fluid coupling associated therewith, said coupling including an impeller fixed in relation to said driving shaft, an external worm gear fixed on said driving shaft, an idler carrier positioned for movement about said driving shaft, idler worms mounted for rotation in said carrier, said fluid coupling including a runner adapted to be driven by said impeller and fixed in relation to said carrier, an internal worm gear positioned about and in mesh with said idler worms, a driven shaft, supporting means thereon, a plurality of idler gears positioned in said supporting means for rotation with respect thereto, an internal gear fixed in relation to said carrier and positioned to engage said last-mentioned idler gears, a second external gear fixed in relation to said internal worm gear and positioned about said driven shaft and meshing with said last-mentioned idler gears.

6. In a drive, a driving shaft, a fluid coupling associated therewith, said coupling including an impeller fixed in relation to said driving shaft, an external worm gear fixed on said driving shaft, an idler carrier positioned for movement about said driving shaft, idler worms mounted for rotation in said carrier, said fluid coupling including a runner adapted to be driven by said impeller and fixed in relation to said carrier, an internal worm gear positioned about and in mesh with said idler worms, a driven shaft, supporting means thereon, a plurality of idler gears positioned in said supporting means for rotation with respect thereto, an internal gear fixed in relation to said carrier and positioned to engage said last-mentioned idler gears, a second external gear positioned about said driven shaft and meshing with said last-mentioned idler gears, and means for joining said internal worm gear and said last-mentioned external gear to prevent relative movement of the two.

7. In a drive, a driving shaft, a fluid coupling associated therewith, said coupling including an impeller fixed in relation to said driving shaft, an external worm gear fixed on said driving shaft, an idler carrier positioned for movement about said driving shaft, idler worms mounted for rotation in said carrier, said fluid coupling including a runner adapted to be driven by said impeller and fixed in relation to said carrier, an internal worm gear positioned about and in mesh with said idler worms, a driven shaft, supporting means thereon, a plurality of idler gears positioned in said supporting means for rotation with respect thereto, an internal gear fixed in relation to said carrier and positioned to engage said last-mentioned idler gears, a second external gear fixed in relation to said internal worm gear and positioned about said driven shaft for rotation with respect thereto, and meshing with said last-mentioned idler gears.

8. In a drive, a driving shaft, a fluid coupling associated therewith, said coupling including an impeller fixed in relation to said driving shaft, an external worm gear fixed on said driving shaft, an idler carrier positioned for movement about said driving shaft, idler worms mounted for rotation in said carrier, said fluid coupling including a runner adapted to be driven by said impeller and fixed in relation to said carrier, an internal worm gear positioned about and in mesh with said idler worms, a driven shaft, supporting means thereon, a plurality of idler gears positioned in said supporting means for rotation with respect thereto, an internal gear fixed in relation to said carrier and positioned to engage said last-mentioned idler gears, a second external gear positioned about said driven shaft for rotation with respect thereto and meshing with said last-mentioned idler gears, and means for joining said internal worm gear and said last-mentioned external gear to prevent relative movement of the two.

9. In a drive, a driving shaft, a fluid coupling associated therewith, said coupling including an impeller fixed in relation to said driving shaft, an external worm gear fixed on said driving shaft, an idler carrier positioned for movement about said driving shaft, idler worms mounted for rotation in said carrier, said fluid coupling including a runner adapted to be driven by said impeller and fixed in relation to said carrier, means for preventing reverse rotation of said carrier, an internal worm gear positioned about and in mesh with said idler worms, a driven shaft, supporting means thereon, a plurality of idler gears positioned in said supporting means for rotation with respect thereto, an internal gear fixed in relation to said carrier and positioned to engage said last-mentioned idler gears, a second external gear fixed in relation to said internal worm gear and positioned about said driven shaft and meshing with said last-mentioned idler gears.

10. In a drive, a driving shaft, a fluid coupling associated therewith, said coupling including an impeller fixed in relation to said driving shaft, an external worm gear fixed on said driving shaft, an idler carrier positioned for movement about said driving shaft, idler worms mounted for rotation in said carrier, said fluid coupling including a runner adapted to be driven by said impeller and fixed in relation to said carrier, means for preventing reverse rotation of said carrier, an internal worm gear positioned about and in mesh with said idler worms, a driven shaft, supporting means thereon, a plurality of idler gears positioned in said supporting means for rotation with respect thereto, an internal gear fixed in relation to said carrier and positioned to engage said last-mentioned idler gears, a second external gear positioned about said driven shaft for rotation with respect thereto and meshing with said last-mentioned idler gears, and means for joining said internal worm gear and said last-mentioned external gear to prevent relative movement of the two.

11. In combination in a drive, a driving shaft, a fluid coupling associated therewith, including an impeller fixed in relation to said shaft, a carrier rotatable about said shaft, a fluid coupling runner fixed in relation to said carrier, an external worm gear positioned on said driving shaft, a plurality of idler worm gears mounted for rotation in said carrier and meshing with said external worm gear, an internal worm gear positioned about said idlers and meshing therewith, a driven shaft, an external gear positioned about said driven shaft for motion with respect thereto, said external gear being joined to said internal worm gear and held against rotation with respect thereto, a second internal gear fixed in relation to said carrier, and a member secured to said driven shaft, a plurality of idler gears mounted for rotation in said member and meshing with said last-mentioned external and internal gears, the axes of said idler worm gears being at right angles to the axes of said second-mentioned idler gears.

12. In combination in a drive, a driving shaft, a fluid coupling associated therewith, including an impeller fixed in relation to said shaft, a carrier rotatable about said shaft, a fluid coupling runner fixed in relation to said carrier, an external worm gear positioned on said driving shaft, a plurality of barrel-shaped idler worm gears mounted for rotation in said carrier and meshing with said external worm gear, an internal worm gear positioned about said idlers and meshing therewith, a driven shaft, an external gear positioned about said driven shaft for motion with respect thereto, said external gear being joined to said internal worm gear and held against rotation with respect thereto, a second internal gear fixed in relation to said carrier, and a member secured to said driven shaft, a plurality of idler gears mounted for rotation in said member and meshing with said last-mentioned external and internal gears, and means for preventing reverse rotation of said first-mentioned carrier, the axes of said idler worm gears being at right angles to the axes of said second-mentioned idler gears.

13. In combination in a drive, a driving shaft, a fluid coupling associated therewith, including an impeller fixed in relation to said shaft, a carrier rotatable about said shaft, a fluid coupling runner fixed in relation to said carrier, an external worm gear positioned on said driving shaft, a plurality of idler worm gears mounted for rotation in said carrier and meshing with said external worm gear, an internal worm gear positioned about said idlers and meshing therewith, a driven shaft, an external gear positioned about said driven shaft for motion with respect thereto, said external gear being joined to said internal worm gear and held against rotation with respect thereto, a second internal gear fixed in relation to said carrier, and a member secured to said driven shaft, a plurality of idler gears mounted for rotation in said member and meshing with said last-mentioned external and internal gears, the axes of said idler worm gears being at an angle to the axes of said second-mentioned idler gears.

14. In a drive, a driving shaft, a fluid coupling associated therewith, said coupling including an impeller fixed in relation to said driving shaft, an external worm gear fixed on said driving shaft, an idler carrier positioned for movement about said driving shaft, idler worms mounted for rotation in said carrier, said fluid coupling including a runner adapted to be driven by said impeller and fixed in relation to said carrier, an internal worm gear positioned about and in mesh with said idler worms, a driven shaft, supporting means thereon, a plurality of idler gears positioned in said supporting means for rotation with respect thereto, an internal gear fixed in relation to said carrier and positioned to engage said last-mentioned idler gears, a second external gear fixed in relation to said internal worm gear and positioned about said driven shaft and meshing with said last-mentioned idler gears, the axes of said idler worms being at right angles to the axis of said driving shaft, and the axes of said last-mentioned idler gears being parallel to the axis of said driving shaft.

15. In combination in a drive, a driven shaft, a fluid coupling associated therewith, said coupling including an impeller fixed with relation to said driving shaft, an external worm gear fixed on said driving shaft, an idler carrier positioned for movement about said driving shaft, a plurality of barrel-shaped idler worms journaled in said carrier and meshing with said external worm gear, said fluid coupling including a runner positioned to be driven by said impeller, and fixed in relation to said idler carrier, and means for preventing reverse rotation of said idler carrier, an internal worm gear positioned about and meshing with said idler worms, a driven shaft, an idler supporting means carired by said driven shaft, a plurality of spur gear pinions positioned in said supporting means for rotation with respect thereto, a member fixed in relation to said idler carrier and carrying an internal spur gear meshing with said spur gear pinions, a member positioned about said driven shaft for rotation with respect thereto and carrying an external spur gear in mesh with said spur gear pinions, and means for preventing relative movement of said last-mentioned spur gear with relation to said internal worm gear.

16. In combination in a drive, a driven shaft, a fluid coupling associated therewith, said coupling including an impeller fixed with relation to said driving shaft, an external worm gear fixed on said driving shaft, an idler carrier positioned for movement about said driving shaft, a plurality of barrel-shaped idler worms journaled in said carrier and meshing with said external worm gear, said fluid coupling including a runner positioned to be driven by said impeller, and fixed in relation to said idler carrier, and means for preventing reverse rotation of said idler carrier, an internal worm gear positioned about and meshing with said idler worms, a driven shaft, an idler supporting means carried by said driven shaft, a plurality of spur gear pinions positioned in said supporting means for rotation with respect thereto, a member fixed in relation to said idler carrier and carrying an internal spur gear meshing with said spur gear pinions, a member positioned about said driven shaft for rotation with respect thereto and carrying an external spur gear in mesh with said spur gear pinions, and means for preventing relative movement of said last-mentioned spur gear with relation to said internal worm gear, the axes of said idler worms being at right angles to the axis of said driving shaft, and the axes of said idler pinions being parallel to the axis of said driving shaft.

17. In combination in a drive, a driving shaft and a driven shaft, and means for driving the driven shaft from the driving shaft, said means including a fluid coupling having an impeller fixed with relation to said driving shaft, and a pair of gear assemblies positioned one about said driving shaft and one about said driven shaft, the gear assembly which is positioned about the driving shaft including a worm gear fixed on the driving shaft, an idler carrier positioned for movement about the driving shaft, and an internal worm and gear positioned about the idlers, there being a fluid coupling runner positioned to be driven by said impeller and fixed in relation to said idler carrier, the gear assembly which is positioned about the driven shaft including an internal gear fixed with relation to said idler carrier, and an external gear movably positioned about said driven shaft and fixed in relation to said internal worm gear, and a plurality of idler pinions supported on said driven shaft and meshing with said last-mentioned gears.

18. In combination in a drive, a driving shaft, a fluid coupling associated therewith, including an impeller fixed in relation to said shaft, a carrier rotatable about said shaft, a fluid coupling runner fixed in relation to said carrier, an external gear positioned on said driving shaft, a plurality of idler gears mounted for rotation in said carrier and meshing with said external gear, an internal gear positioned about said idlers and meshing therewith, a driven shaft, an external gear positioned about said driven shaft for motion with respect thereto, said external gear being joined to said first mentioned internal gear and held against rotation with respect thereto, a second internal gear fixed in relation to said carrier, and a member secured to said driven shaft, a plurality of idler gears mounted for rotation in said member and meshing with said last-mentioned external and internal gears.

SYDNEY C. WATSON.